United States Patent [19]
Saji

[11] Patent Number: 5,398,031
[45] Date of Patent: Mar. 14, 1995

[54] DTMF SIGNAL GENERATING CIRCUIT

[75] Inventor: Mitsuro Saji, Kyoto, Japan

[73] Assignee: Rohm Co., Ltd., Kyoto, Japan

[21] Appl. No.: 932,127

[22] Filed: Aug. 18, 1992

Related U.S. Application Data

[63] Continuation-in-part of Ser. No. 558,463, Jul. 27, 1990, abandoned.

[30] Foreign Application Priority Data

Jul. 28, 1989 [JP] Japan .................. 1-195580

[51] Int. Cl.⁶ .............................. H04Q 1/00
[52] U.S. Cl. ................... 341/173; 379/362;
  327/115; 327/113; 375/272; 375/275; 375/306
[58] Field of Search ............ 341/173; 340/825.71,
  340/825.73; 375/45, 48, 62, 65; 370/110.2;
  379/361, 355, 67, 362; 328/25, 30, 51; 332/100

[56] References Cited

U.S. PATENT DOCUMENTS

| | | | |
|---|---|---|---|
| 4,748,640 | 5/1988 | Staley | 375/65 |
| 4,922,527 | 5/1990 | Nonami | 379/361 |
| 4,998,276 | 3/1991 | Hasegawa | 379/361 |

FOREIGN PATENT DOCUMENTS 3-60255 3/1991 Japan.

Primary Examiner—Michael Horabik
Assistant Examiner—Brian Zimmerman
Attorney, Agent, or Firm—Fish & Richardson

[57] ABSTRACT

A DTMF signal generating circuit for producing output of a selection signal having a frequency corresponding to a signal entered from push buttons. A high frequency oscillation signal output from an oscillatory circuit are delivered to both a first frequency dividing circuit for dividing high frequency signals by a first dividing ratio and a second frequency dividing circuit for dividing high frequency signals by a second dividing ratio, thereby producing two kinds of divided signals each of which has its own predetermined frequency. A fractional frequency division is then accomplished by switching from an output of a first frequency dividing circuit to an output of a second frequency dividing circuit at a predetermined timing. The signals output form the switch are then counted by a ROM address counter, producing an output of an address value signal. The address value signal is then delivered to a sine wave output ROM in which peak values in response to a predetermined sine waveform are preliminary stored in the order of address value, so that 32 digital data corresponding to the input address values are output. Concurrently, a switching rate generator of a frequency dividing circuit supplies a switching timing signal, which is determined by both an address value signal delivered from the ROM address counter and a dividing ratio signal entered from the key input control circuit, to a key input control circuit, thereby generating DTMF signals highly similar to the standard DTMF frequency.

9 Claims, 8 Drawing Sheets $N = (11 \times 4 + 12 \times 28)/32$
$N = 11.875$ $N = (10 \times 8 + 9 \times 24)/32$
$N = 9.25$ $N = (9 \times 12 + 8 \times 20)/32$
$N = 8.375$ $N = (7 \times 14 + 8 \times 18)/32$
$N = 7.5625$ $N = (6 \times 5 + 7 \times 27)/32$
$N = 6.84375$

FIG. 3

| STANDARD FREQUENCY Fs (Hz) | | F/N | N | ΔF % |
|---|---|---|---|---|
| LOW-GROUP FREQUENCIES | R1 697 | 696.41 | 16.0625 | -0.08 |
| | R2 770 | 769.79 | 14.53125 | -0.03 |
| | R3 852 | 852.27 | 13.125 | 0.03 |
| | R4 941 | 941.99 | 11.875 | 0.10 |
| HIGH-GROUP FREQUENCIES | C1 1209 | 1209.31 | 9.25 | 0.03 |
| | C2 1336 | 1335.65 | 8.375 | -0.03 |
| | C3 1477 | 1479.15 | 7.5625 | 0.15 |
| | C4 1633 | 1634.50 | 6.84375 | 0.09 |

FIG. 4

PRIOR ART

| STANDARD FREQUENCY Fs (Hz) | | F/N | N | ΔF % |
|---|---|---|---|---|
| LOW-GROUP FREQUENCIES | R1 697 | 699.1 | 160 × 32 | + 0.3 |
| | R2 770 | 766.2 | 146 × 32 | − 0.49 |
| | R3 852 | 847.4 | 132 × 32 | − 0.54 |
| | R4 941 | 948.0 | 118 × 32 | + 0.74 |
| HIGH-GROUP FREQUENCIES | C1 1209 | 1215.9 | 92 × 32 | + 0.57 |
| | C2 1336 | 1331.7 | 84 × 32 | − 0.32 |
| | C3 1477 | 1471.9 | 76 × 32 | − 0.35 |
| | C4 1633 | 1645.0 | 68 × 32 | + 0.73 |

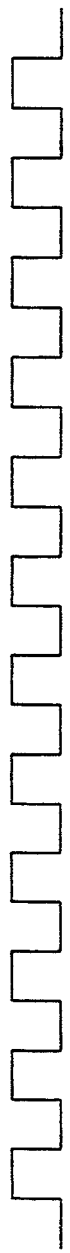
FIG. 7(CK)
FIG. 7(A)
FIG. 7(B)
FIG. 7(C)
FIG. 7(D)

DTMF SIGNAL GENERATING CIRCUIT

BACKGROUND OF THE INVENTION

This is a continuation-in-part of U.S. patent application Ser. No. 07/558,463, filed Jul. 27, 1990, now abandoned.

This invention relates to a selection signal generating circuit for generating a selection signal when dialed by means of a telephone set, and more particularly to a dual-tone multifrequency signal generating circuit.

Two types of signal systems are generally employed in prior art telephone sets, namely, a dial-pulse code and a dual-tone multifrequency (hereinafter referred to as "DTMF") code. In telephone sets which use a dial-pulse signal, direct-current pulses generated by periodically interrupting the line circuit are employed as dial signals. This type of signal system has been used in most telephone sets to date. In the DTMF signal system, a pair of different frequency signals represent each pushbutton for dialing. The different frequency signals are normally generated by frequency dividing high frequency clock pulses output from a high frequency oscillator.

According to existing standards, each of the frequency signal pairs is selected from low-group frequencies (R1 to R4) and high-group frequencies (C1 to C4) as shown in FIG. 4. Specifically, one pushbutton corresponds to each of sixteen signals selected from a 4×4 matrix of pushbuttons, that is, four rows and four columns.

In order to obtain signals which are similar to the standard frequencies Fs (Hz), an oscillation frequency F is set to as high as 3.579545 MHz, and this high frequency is divided by a given number of stages N. Such frequency division enables the frequencies highly similar to the standard frequencies Fx shown in FIG. 4 to be obtained.

Here, $\Delta F$ represents errors between the standard frequencies Fs and the frequencies obtained by frequency division and is given by $$\Delta F = \{(F/N)/Fs) \cdot 100(\%)\}.$$

Of course, it is desirable to reduce the amount of errors $\Delta F$ as much as possible. On this point, there are now regulations which require that the errors do not exceed the range of $\pm 1.5\%$.

When DTMF signals are obtained by frequency division of a signal which is directly output from the high frequency oscillator in the manner mentioned above, a number of high frequency switching elements are required, thus causing a lot of current dissipation. This is because there is a small amount of through current which flows each time the condition of the counter changes. Thus, if the counter has a short period, the current dissipated is increased. As a result, it becomes hard to obtain sufficient power to operate the DTMF signal generating circuit directly from the telephone lines.

Further, as mentioned above, although the errors $\Delta F$ which arise when performing a frequency division using the oscillator of 3.579545 MHz are fairly small, these errors are enlarged due to errors initially present in an oscillator exteriorly disposed at an IC, errors due to secular changes, and the oscillation frequency shift due to thermal changes. For this reason, there is a demand for reducing the amount of the errors $\Delta F$ much more.

To this end, Applicant proposed a selection signal generating circuit capable of producing highly accurate DTMF signals in the Japanese Patent Application Laid-Open No. 154836/'87.

According to this conventional circuit, a signal having an accurate frequency is obtained by a fractional division that is accomplished by combining two kinds of signals each of which is divided according to a predetermined dividing ratio.

This selection signal generating circuit is now explained with reference to FIG. 5 of the accompanying drawings. First, a high frequency pulse signal of 357.9545 kHz is obtained by dividing a signal having a frequency of 3.579545 MHz output from an oscillator (not shown) by a dividing ratio of 10. This signal is delivered to a ROW-side frequency counter 10 which consists of, for example, five T-type flip-flop circuits and is capable of counting from 0 to 31 (32 total).

A signal of values counted by the ROW-side frequency counter 10 is then transferred to both a ROW-side first frequency divider 12 and a ROW-side second frequency divider 14. Although the ROW-side frequency counter 10 can supply 32 signals on the counted results, only four of them are necessary to generate DTMF signals. Four AND gates are included in respective the ROW-side first frequency divider 12 and the ROW-side second frequency divider 14, and each AND gate thereof is designed to operate based on a predetermined value of the counted results delivered from the ROW-side dividing counter 10.

The timing of outputting this count result signal is determined by a dividing ratio which is prescribed for each DTMF signal selected by a push button and is output from one of the AND gates in the ROW-side first frequency divider 12 or in the ROW-side second frequency divider 14, either of which is determined by the count signal.

Unless a fractional frequency division is conducted, there needs to be only one frequency divider which functions in such a manner that one of the frequency dividers starts to operate and produce an output when the value counted by the dividing counter 10 amounts to the value determined by a given dividing ratio N. This dividing counter 10 is reset by the signal output from the frequency divider. According to the above-mentioned circuit, however, it is necessary to alter one frequency dividing ratio to another in the middle of forming one cycle of a sine waveform in order to achieve a fractional division. For this purpose, there are provided two frequency dividers, i.e., the first frequency divider 12 and the second frequency divider 14 so that two kinds of signal each of which has a different dividing ratio can be produced and output in the form of one sine waveform.

For example, in the case of a combination of frequency ratios 17, 16, it is simply required to set in such a manner that one of the AND circuits in the ROW-side first frequency divider 12 produces an output at the count rate of 17 while one of the AND gates in the ROW-side second frequency divider 14 produces an output at the rate of 16.

To accomplish a switching operation as mentioned above, first frequency divider 12 and second frequency divider 14 are connected to a switch 16. This switch 16 is to select one output signal from either the first frequency divider 12 or the second frequency divider 14.

Further, this switch 16 supplies the selected signal to a ROM address counter 18.

The ROM address counter 18 counts up the signal sent from the switch 16 to produce an address value signal to be supplied to a sine wave output ROM 20. In this sine wave output ROM 20 peak values, each of which represents the height of a predetermined sine waveform, are stored in the order of address so as to correspond to the respective address value signals delivered from the address counter 18. Assuming that these peak values represent data long & axis which respectively correspond to 32 address data long the X axis, it is possible to output digital data for forming a predetermined sine waveform in proportion to variations of the input signal from 0 to 31.

Finally, alternative-current signals for DTMF signal use are obtained by converting the outputs from the sine wave output ROM 20 into analog signals by means of a D/A converter 22. The analog output delivered from the D/A converter 22 is in the form of a predetermined sine curve; and a frequency thereof is equivalent to the frequency one cycle of which is formed of 32 digital data output from both the ROW-side first frequency divider 12 and the ROW-side second frequency divider 14. Consequently, the aforementioned frequency signals R1 to R4 can be obtained by setting a timing at which every four AND circuits included in the ROW-side first frequency divider 12 and the ROW-side second frequency divider 14 are turned on.

Here, since the ROW-side frequency counter 10 is required to be reset to 0 the moment the counted values amount to a predetermined value, the ROW-side frequency counter 10 is designed in a manner to be reset when an output fed back from the switch 16 changes to "high".

Meanwhile, the outputs from both the ROW-side first frequency divider 12 and the ROW-side second frequency divider 14 are also supplied to a divider switching rate counter 24. This switching rate counter 24 is to determine the timing for switching switch 16 and consists of four T-type flip-flop circuits capable of counting up to 16. The switching rate counter 24 supplies values ranging from 0 to 15 to a ROW-side switching rate generator 26. The ROW-side switching rate generator 26 comprises four AND circuits each of which produces an output of "high" when count values delivered from the rate counter 24 amount to a predetermined value. The output signal of "high" is subsequently transferred to the switch 16, inducing a switching operation.

In other words, although a signal of a predetermined dividing ratio is produced in response to a dialing signal when entered from pushbuttons, according to the conventional circuit, a dividing ratio changes from one to another in the middle of forming a predetermined sine waveform. Although the obtained sine waveform is not a perfect in shape, it can be produced with high accuracy because the dividing ratio thereof can be obtained in the form of decimal fraction. In the case of the sine waveform being composed of 32 digital data, given that two of them are formed at a count rate of 17 and the other data of 30 are formed at a count rate of 16, the total frequency ratio is obtained as 16.0625. If a signal of 357.9545 kHz is divided by a dividing ratio of 16.0625, it is possible to obtain an output frequency of 696.41 Hz and reduce errors thereof to as small as 0.08%. Thus, it is possible to obtain frequencies of the four DTMF signals with high accuracy.

As described above, according to the conventional selection signal generating circuit, since a frequency dividing ratio is determined in the form of a decimal fraction, it is possible to obtain a signal with an accurate frequency.

However, according to this conventional circuit, the rate counter 24 and the ROW-side switching rate generator 26 are necessary to achieve the above mentioned fractional division. As a matter of course, in practice, it is necessary to form the four DTMF signals at COLUMN side in the same manner as obtained at the ROW side though only the ROW side is explained in the foregoing. This means the same circuit that is provided at the ROW side is also necessary at the COLUMN side, so that one more set of the rate counter 24 and the ROW-side switching rate generator 26 is to be provided. With respect to the circuit configuration of ICs, the flip-flop circuits like the rate counter 24 occupy a relative large area in the IC, and they also dissipate a fairly large amount of power. Therefore, there is a demand for reducing the number of counters to be embedded in the IC.

SUMMARY OF THE INVENTION

This invention is made to solve the above mentioned problems, and to provide a DTMF signal generating circuit which is capable of producing an output in the form of a decimal fraction with a relative ease circuit configuration.

Generally, circuit designing and layout of IC have been practiced in every function block to facilitate the work of them. For this reason, designing a circuit for generating a sine waveform and designing a circuit for frequency division, the purpose of which completely differ from each other, are conducted without any relevance between them. In this conventional circuit designing practice, it is extremely hard to come to an idea of designing a circuit in common with different function blocks. On this point, however, the invention of this application found that the operation of the ROM address counter is equivalent to that of the rate counter in the process of working on a signal generating apparatus, which the inventor filed prior to this application, and of studying how to improve the efficiency thereof, finally achieving this invention.

According to one aspect of the present invention, a DTMF signal generating circuit comprises an oscillatory circuit for generating pulse signals having a predetermined high frequency; a first frequency dividing circuit for dividing pulse signals which are delivered from the oscillatory circuit by a first dividing ratio; a second frequency dividing circuit, which is connected in parallel with the first frequency dividing circuit, for dividing the pulse signals which are delivered from said oscillatory circuit by a second dividing ratio; a switch for switching an output from the first frequency dividing circuit to an output from the second frequency dividing circuit at a predetermined timing; a ROM address counter for counting the signal output from the switch and resetting a counted value each time it amounts to a prescribed value, thereby producing an output of an address value signal; a sine wave output ROM for producing an output of digital data which forms a predetermined sine waveform on the basis of the address value signal input from the ROM address counter; a key input control circuit for determining a dividing ratio in response to a signal entered from pushbuttons; and a switching rate generator of a frequency dividing circuit for generating a switching timing which is determined by the address value signal delivered from the ROM address counter and a dividing ratio entered from the key input control circuit.

According to the DTMF signal generating circuit of this invention, a high frequency pulse signal delivered from an oscillatory circuit is input to both a first frequency dividing circuit and a second frequency dividing circuit. The signal output from either of the two frequency dividing circuits is then transferred to a switch which switches an output therefrom at a predetermined timing, thereby accomplishing a fractional division. The signal output from the switch is then counted by a ROM address counter at a predetermined count rate, finally being output as an address value. This address value signal is then input to a sine wave output ROM, which preliminary stores peak values for forming a predetermined sine waveform, produces an output in the form of digital data. The aforementioned switch starts a switching operation on the basis of a timing signal determined by the address value signal delivered from the ROM address counter and the key input control circuit, thereby producing a DTMF signal with high accuracy.

Specifically, according to the DTMF signal generating circuit of this invention, the address value generated by the ROM address counter is supplied to the switching rate generator. Further, a timing signal for switching which corresponds to a dividing ratio delivered form the key input control circuit is supplied to this switching rate generator. Now, this switching rate generator is capable of generating a timing signal for switching based on an output form the ROW-side address counter. Consequently, the rate counter becomes unnecessary because the timing signal for switching which is output from this rate generating circuit causes the switching operation, thereby simplifying the circuit configuration and enhancing the efficiency of the IC as a whole.

In order that all the advantages of the invention obtained in practice, a preferred embodiment thereof, given by way of example only, is described in detail hereinafter, with reference to the accompanying drawings.

BRIEF DESCRIPTION OF THE DRAWINGS

FIG. 3 is a chart showing errors of output frequencies in accordance with the first embodiment of the present invention;

FIG. 4 is a chart showing errors of output frequencies in accordance with the prior art;

FIG. 7 is a timing diagram for the circuit of FIG. 6.

DETAILED DESCRIPTION OF THE INVENTION

A DTMF signal generating circuit according to a first embodiment of the present invention will now be described.

Figure 1:
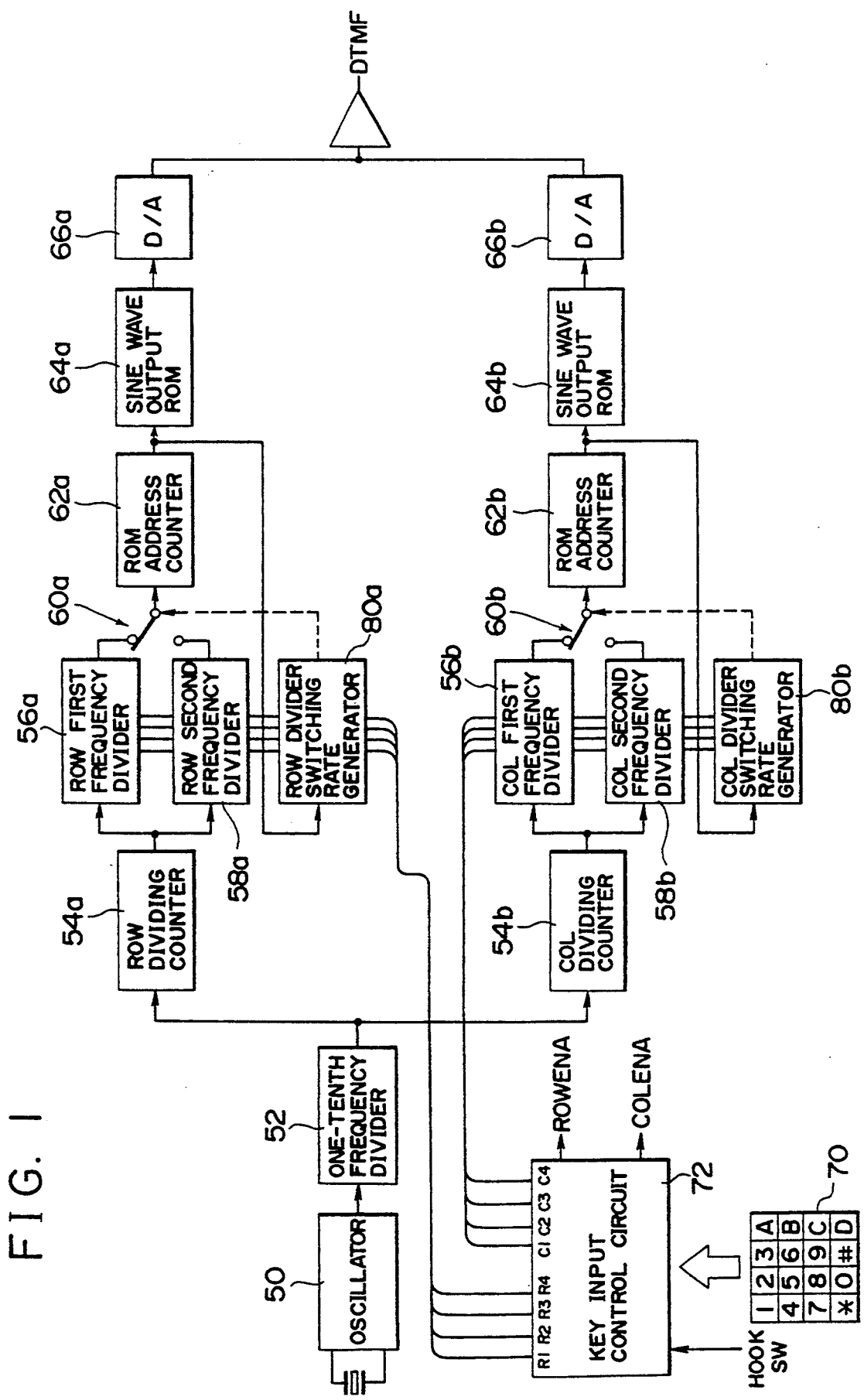
FIG. 1 is a block diagram showing a configuration of a DTMF signal generating circuit in accordance with a first embodiment of the present invention.

FIG. 1 is a block diagram showing a configuration of a DTMF signal generating circuit according to a first embodiment of the present invention, wherein an oscillatory circuit 50 produces an output of pulse signals having a frequency of 3.579545 MHz. The frequency of the output from this oscillatory circuit 50 is divided by ten to 357.9434 kHz by means of a one-tenth frequency divider 52. This output signal from the one-tenth frequency divider 52 is delivered to two frequency counters 54, i.e., a ROW-side frequency counter 54a and a COL-side frequency counter 4b.

Here, since the circuit configuration of the COL-side is identical with that of the ROW-side, reference symbols, a, b, are given to the corresponding parts through the accompanying drawings. They symbols a, b are omitted in the explanation hereafter.

The frequency counter 54 has the same configuration of the ROW-side frequency counter 10 of the conventional signal generating circuit. Specifically, the counter 54 consists of five T-type flip-flop circuits. With this configuration, the frequency counter 54 produces signals from 0 to 31. Further, the circuit configurations of a first frequency divider 56, a second frequency divider 58, a switch 60, a ROM address counter 62, a sine wave output ROM 64, a D/A converter 66 in FIG. 1 are identical with those of the ROW-side first frequency divider 12, the ROW-side second frequency divider 18, the sine wave output ROM 20, and the D/A converter 22 in FIG. 3, whereby it is possible to generate DTMF signals each of which has its own predetermined frequency. Pressing a push button of key pads 70 enables a dialing signal to be inputted into a key input control circuit 72. Responding to the signal input, a pair of high signals are output from the signal lines selected from a matrix of R1, R2, R3, R4, and C1, C2, C3, C4. Concurrently, AND circuits of the first frequency divider 56 and the second frequency divider 58, which correspond to the signal delivered from the key input control circuit, are rendered operative. Accordingly, a high output is produced by either of the first frequency divider 56 or the second frequency divider 58 when the count values output from the dividing counter 54 amount to a predetermined value. The dividing counter 54 is reset when the high signal is output from either of the first frequency divider or the second frequency divider via the switch 60. In other words, each of the first and second frequency dividers 56, 58 outputs pulse signals at a predetermined count rate which corresponds to a predetermined dividing ratio through the switch 60.

One of the advantages of this invention is that a divider switching rate generator 80, to which address values output from a ROM address counter 62 are inputted, is added to the DTMF signal generating circuit. This divider switching rate generator 80 generates a timing signal for switching which corresponds to the address values output from the ROM address counter 62 for specifying the address in a sine wave output ROM 64. Consequently, according to the present invention, it becomes possible to determine a switching timing of the switch 60 utilizing the count values output from the ROM address counter 62 without the divider switching rate counter.

The operation of the DTMF signal generating circuit will now be explained with reference to FIG. 2. In this embodiment, a sine waveform is formed of data in units of 32, i.e., from 0 to 31 addressed in the sine wave output ROM 64. In other words, each of the addresses from 0 to 31 has its corresponding digital data in the longitudinal direction of a sine waveform as shown in FIG. 21. A timing of generating address data for one cycle is controlled by the output form either the first frequency divider 56 or the second frequency divider 58.

For example, when performing a frequency division to generate a first signal of low-group frequency signals (ROW 1), the first two data, i.e., 0 and 1, are divided by the dividing ratio of one seventeenth while the remaining data, i.e., from 2 to 31, are divided by the ratio of one sixteenth. In this case, AND circuits corresponding to R1 in the ROW-side first frequency divider 56a produces a high output when the count values in the ROW-side frequency counter 54A amount to 17. This signal is thereafter delivered to the ROM address counter 62 through the switch 60. When the count values amount to 2, i.e., an address value of 1 in the ROM address counter 62, the AND circuits, in the ROW-side divider switching rate generator 80a, to which a high input is supplied are tuned on based on the signal R1 delivered from the key pads 70. Then the switch 601 operates based on a signal output from these AND circuits, whereby the output from the ROW-side second frequency divider 58a is supplied to the ROM address counter 62a through the switch 601. Here, the ROW-side second frequency divider 58a is set to produce an output of high when the output value produced by the ROW-side frequency counter 54a amounts to 16. If the switch 601 is switched to the ROW-side second frequency divider 58a side, a frequency division by a count rate of 16 is accomplished.

Accordingly, the frequency dividing ratio of a sine waveform output from the sine wave output ROM 64a is calculated as:

$$N = (17 \times 2 + 16 \times 30)/32$$
$$= 16.0625$$

resulting in a fractional division. With this frequency division 16.0625, it is possible to obtain an output frequency of 696.41 as shown in FIG. 3. This figure shows that the error of this sine waveform is −0.08%. Thus, it becomes possible to obtain a frequency signal with high accuracy.

The same fractional frequency division is possible for other frequency signals, whereby DTMF signals with a very small amount of frequency error ΔF as shown in FIG. 3 are generated.

Figure 2A:
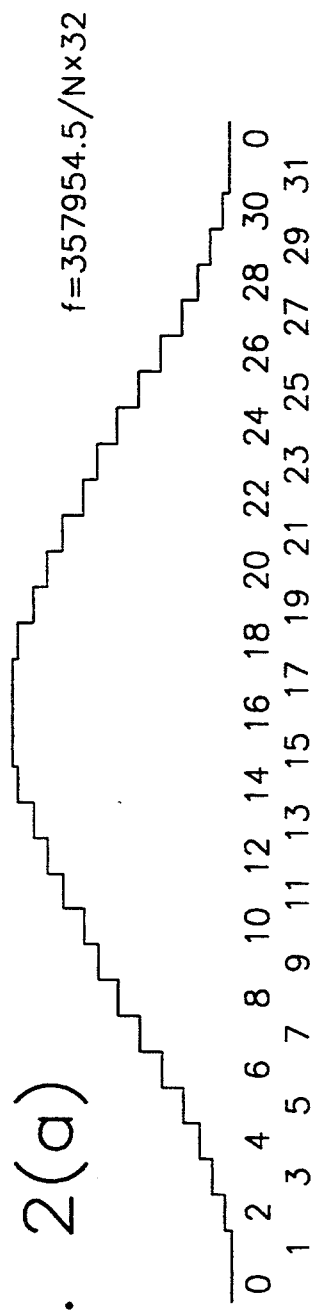
FIG. 2 is an explanatory view for illustrating characteristics of frequency divisions and a sine waveform in accordance with the first embodiment of the present invention.
Figure 2B:
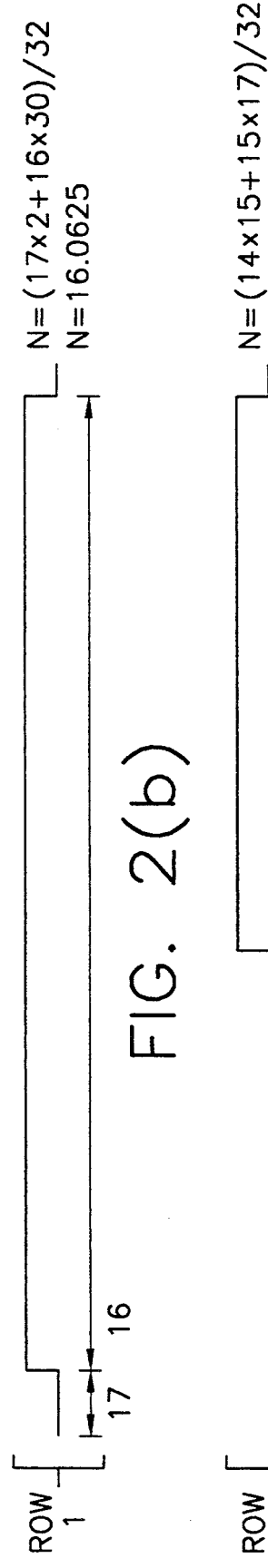
Figure 2C:
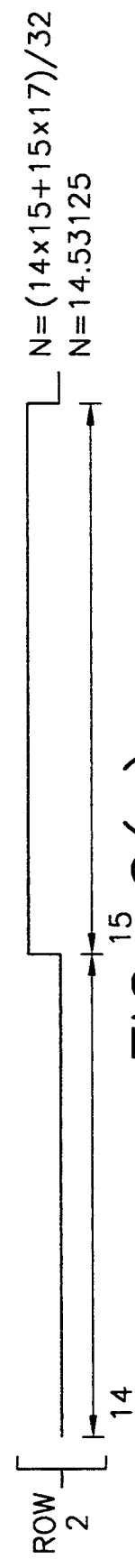
Figure 2D:
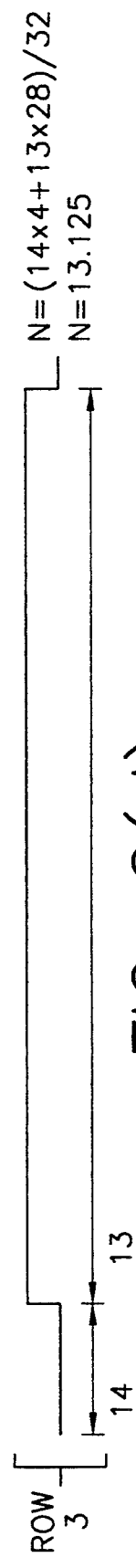
Figure 2E:
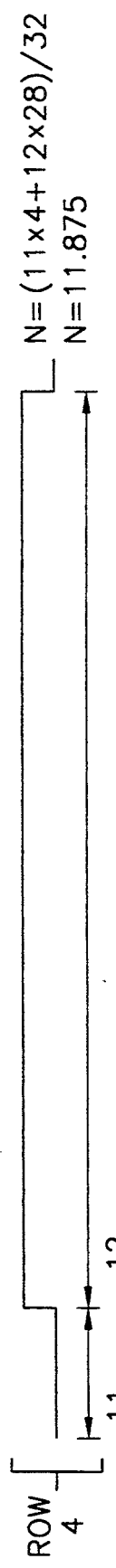
Figure 2F:
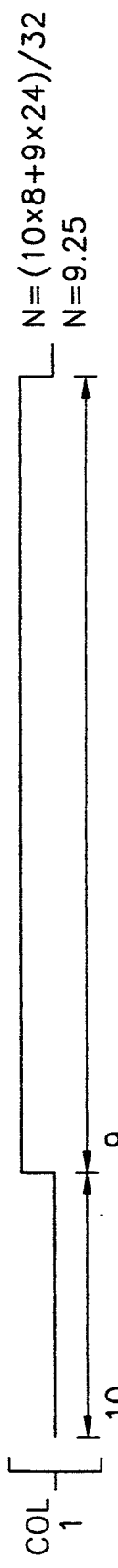
Figure 2G:
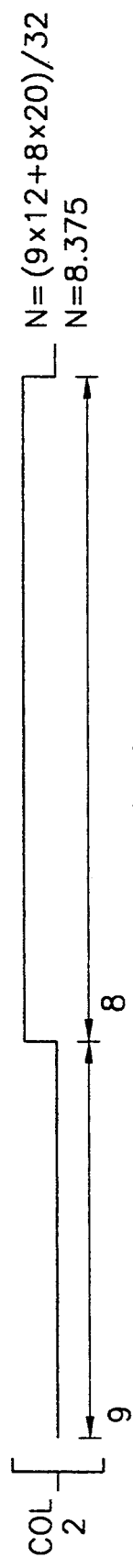
Figure 2H:
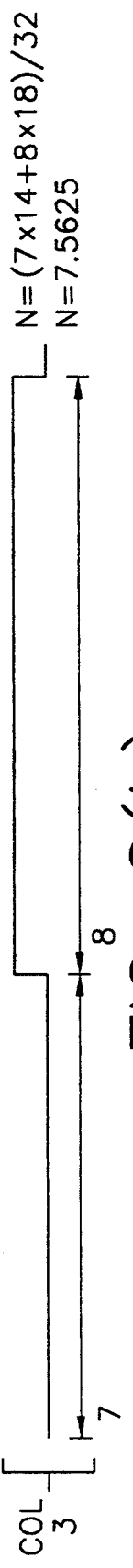
Figure 2I:
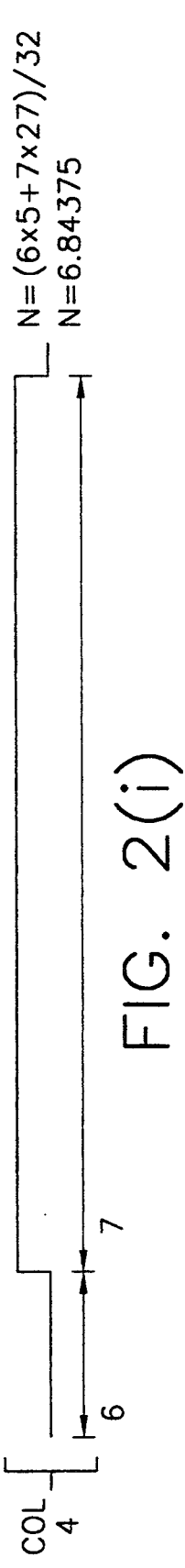
Figure 5:
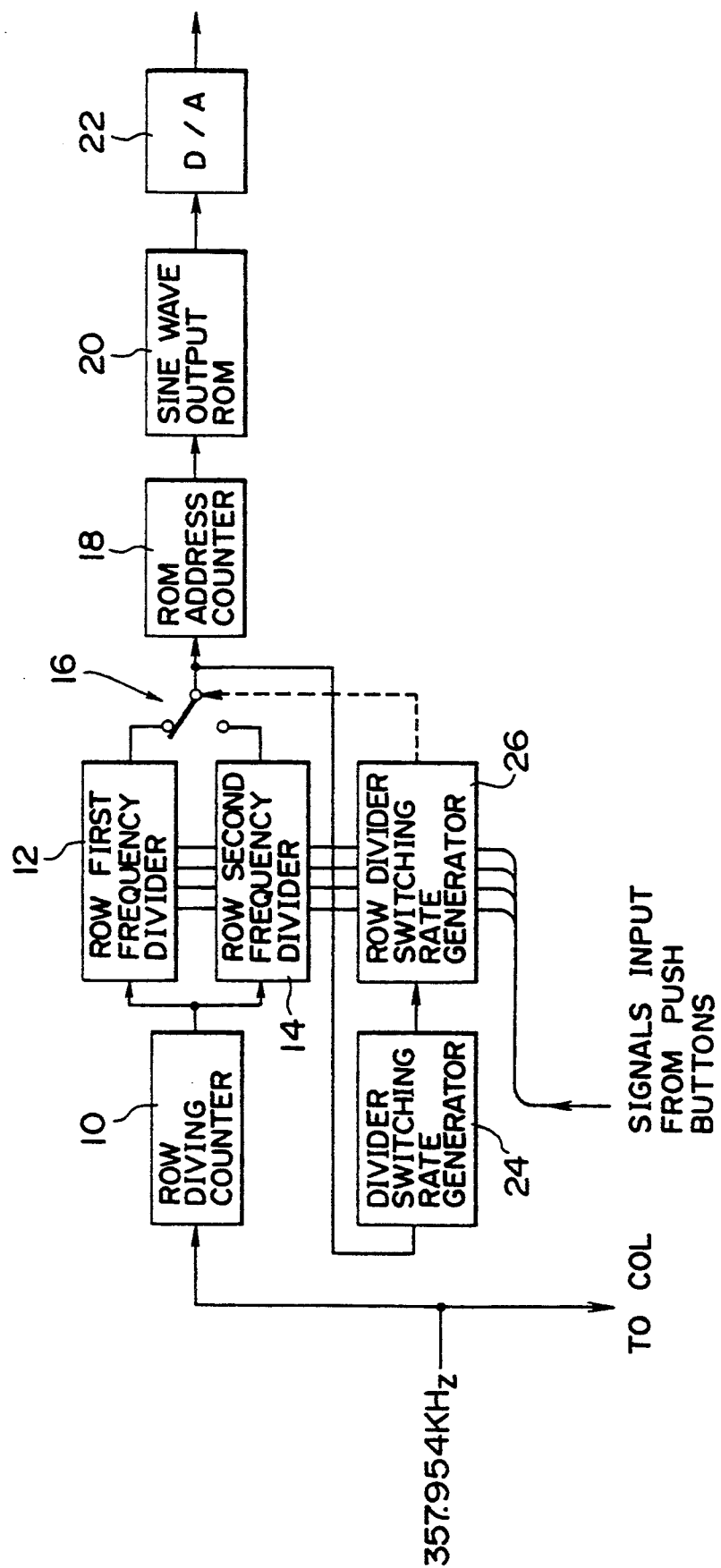
FIG. 5 is a block diagram showing a structure of a conventional selection signal generating circuit.

As shown in FIG. 2(b), the minimum frequency dividing ratio is six (for COL 4). When the dividing counter 54 counts four clocks, the switch can always be switched while there is no output pulse from the dividers 56 and 58. The timing to switch the switch can be set to any of the count values 1 to 5 as well as 4.

Figure 6:
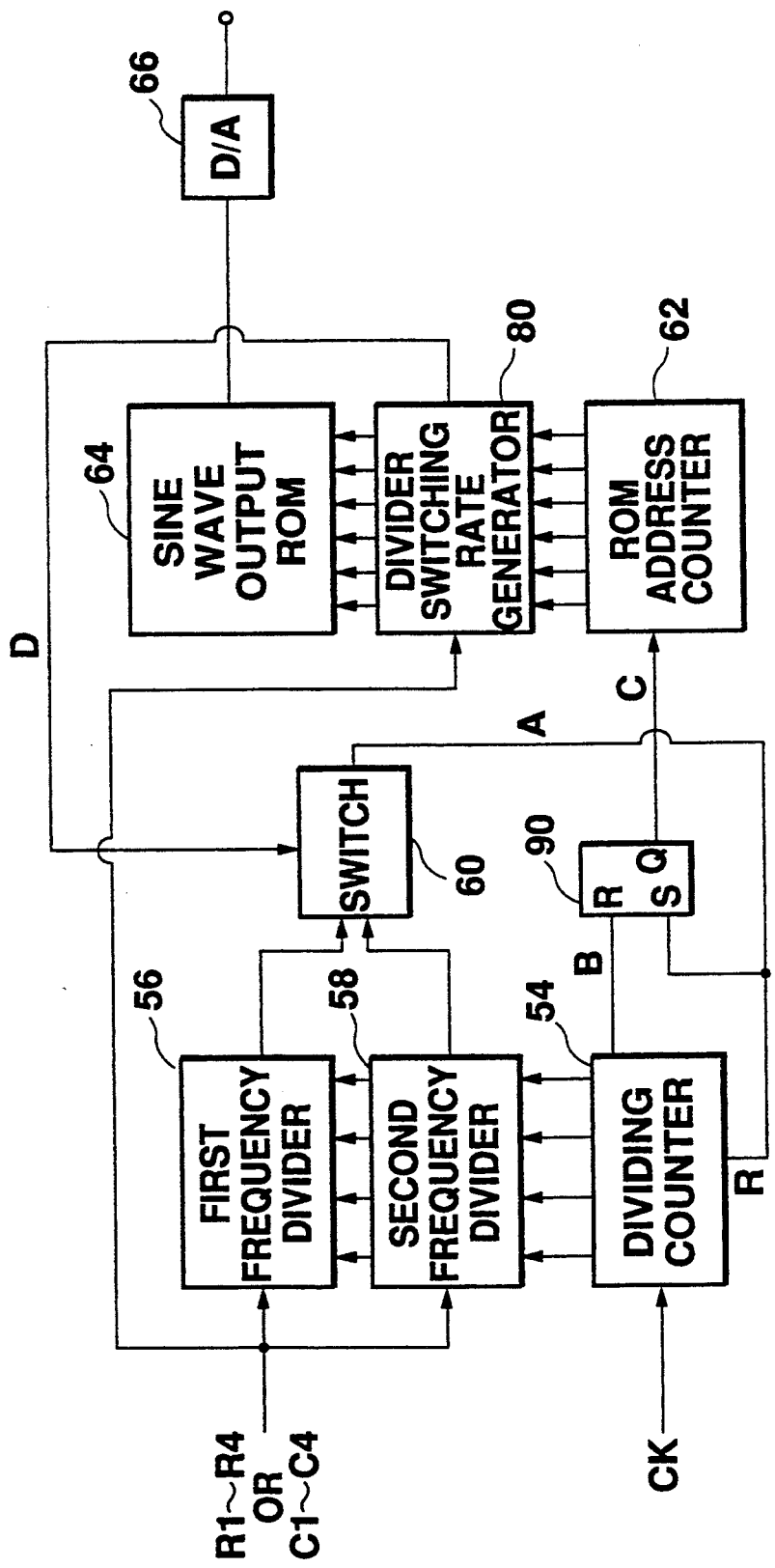
FIG. 6 is a block diagram showing a DTMF signal generating circuit in accordance with another embodiment.

FIG. 6 shows a further embodiment of the invention. In this embodiment, an output of the switch 60 is input to the ROM address counter 62 via the ROM address clock generator 90, which includes an RS flip-flip. The ROM address clock generator 90 receives at its S input an output signal A from the switch 60, and receives at its R input a signal B from the dividing counter 54. In this embodiment, the signal B is a pulse signal which is generated each time four input clocks CK are counted.

As shown in FIG. 7, when a pulse is output as the output signal A of either the first frequency divider 56 or the second frequency divider 58, the dividing counter 54 is reset so as to recount the clocks. On the other hand, the output signal C of the ROM address clock generator 90 becomes H. When the dividing counter 54 counts four clocks, the signal B becomes H, thereby letting the signal C. become L. The ROM address counter 62 counts the trailing edges of the signals C.

When the counted value of the ROM address counter 62 represents the timing to switch the switch 60, the output signal D of the divider switching generator 80 becomes H, so that the switch 60 is switched. The ROM address clock generator 90 may be any circuit so long as it can delay the trailing edge position of the clock C to a preset extent.

When no ROM address clock generator 90 is provided, there is a danger that the ROM address counter 62 will count incorrectly because the timing of the switch 60 coincides with the timing of the outputs of the dividers 56 and 58. Particularly, since the dividers 56 and 58 have very close timing, there is a certain probability of error in counting by the ROM address counter 62. In this embodiment, however, the timing to switch the switch 60 is delayed by the ROM address clock generator 90. Therefore, the switch 60 is reliably switched while no output pulse comes from either the first or second frequency divider 56 or 58.

As described above, in accordance with the DTMF signal generating circuit of the present invention, a switching rate signal is generated using the address values output from the sine wave output ROM. Therefore, it becomes possible to generate a switching rate signal without a rate counter separately provided only for this use, thereby saving two counters and reducing the number of the circuits in the entire circuit.

What is claimed is:

1. A DTMF signal generating circuit for producing an output of a selection signal which corresponds to a signal entered from pushbuttons, said circuit comprising:

(a) an oscillatory circuit for generating pulse signals having a predetermined high frequency;

(b) a first frequency dividing circuit for dividing pulse signals which are delivered from said oscillatory circuit by a first dividing ratio;

(c) a second frequency dividing circuit, which is connected in parallel with said first frequency dividing circuit, for dividing said pulse signals which are delivered from said oscillatory circuit by a second dividing ratio;

(d) a switch for switching from an output of said first frequency dividing circuit to an output of said second frequency dividing circuit at a switching timing;

(e) a ROM address counter for counting the signal output from said switch and resetting a counted value each time it amounts to a prescribed value, thereby producing an output of an address value signal;

(f) a sine wave output ROM for producing an output of digital data which represents a predetermined sine waveform on the basis of said address value signal delivered from said ROM address counter;

(g) a key input control circuit for determining a dividing ratio in response to a signal entered from the pushbuttons; and (h) a switching rate generator responsive to the ROM address counter at the key input control circuit for generating the switching timing for the switch, wherein the switching timing is determined in accordance with the address value signal from the ROM address counter and the dividing ratio signal from the key input control circuit.

2. A DTMF signal generating circuit according to claim 1, said DTMF signal generating circuit further comprising a one-tenth frequency divider connected between said oscillatory circuit and said first and second frequency dividing circuits which divides said high frequency pulse signals output from said oscillatory circuit into pulse signals having one tenth the predetermined high frequency.

3. A DTMF signal generating circuit according to claim 1, wherein said first frequency dividing circuit comprises a first frequency divider, wherein said second frequency dividing circuit comprises a second frequency divider, and wherein a frequency counter is provided which is common to said first frequency dividing circuit and said second frequency dividing circuit.

4. A DTMF signal generating circuit according to claim 1, wherein the predetermined high frequency of said oscillatory circuit is 3.579545 MHz.

5. A DTMF signal generating circuit for producing an output of a selection signal which corresponds to a signal entered from pushbuttons, said circuit comprising:

(a) an oscillatory circuit for generating pulse signals having a predetermined high frequency;

(b) a one-tenth frequency divider for dividing pulse signals which are delivered from said oscillatory circuit into pulse signals having one tenth the predetermined high frequency;

(c) a first frequency dividing circuit for dividing pulse signals which are delivered from said one-tenth frequency divider by a first dividing ratio;

(d) a second frequency dividing circuit, which is connected in parallel with said first frequency dividing circuit, for dividing pulse signals output from said one-tenth frequency divider by a second dividing ratio;

(e) a switch for switching from an output of said first frequency dividing circuit to an output of said second frequency dividing circuit at a switching timing;

(f) a ROM address counter for counting said signal output from said switch and resetting a counted value each time it amounts to a prescribed value, thereby producing a digital output of an address value signal;

(g) a sine wave output ROM for producing an output of digital data which represents a predetermined sine waveform on the basis of said address value signal input from said ROM address counter;

(h) a digital/analog converter for converting the digital output of the ROM address counter into an analog signal;

(i) a key input control circuit for determining a dividing ratio signal in response to a signal entered from the pushbuttons; and (j) a switching rate generator responsive to the ROM address counter and the key input control circuit for generating the switching timing for the switch, wherein the switching timing is determined in accordance with the address value signal from the ROM address counter and the dividing ratio signal form the key input control circuit.

6. A DTMF signal generating circuit according to claim 5, wherein said first frequency dividing circuit comprises a first frequency divider, wherein second frequency dividing circuit comprises a second frequency divider, and wherein a frequency counter is provided which is common to said first frequency dividing circuit and said second frequency dividing circuit.

7. A DTMF signal generating circuit according to claim 5, wherein the predetermined high frequency of said oscillatory circuit is 3.579545 MHz.

8. A DTMF signal generating circuit for producing an output of a selection signal which corresponds to a signal entered from push buttons, said circuit comprising:

(a) an oscillatory circuit for generating pulse signals having a predetermined high frequency range;

(b) a first frequency dividing circuit for dividing pulse signals which are delivered from said oscillatory circuit by a first dividing ratio;

(c) a second frequency dividing circuit, which is connected in parallel with said first frequency dividing circuit, for dividing said pulse signals which are delivered from said oscillatory circuit by a second dividing ratio;

(d) a switch for switching from an output from said first frequency dividing circuit to an output of said second frequency dividing circuit at a switching timing;

(e) a ROM address counter for counting the signal output from said switch and resetting a counted value each time it amounts to a prescribed value, thereby producing an output of an address value signal;

(f) a sine wave output ROM for producing an output of digital data which represents a predetermined sine waveform on the basis of said address value signal delivered from said ROM address counter;

(g) a key input control circuit for determining a dividing ratio in response to a signal entered from the pushbuttons; and (h) a switching rate generator responsive to the ROM address counter and the key input control circuit for generating the switching timing for the switch, wherein the switching timing is determined in accordance with the address value signal from the ROM address counter and the dividing ratio signal from the key input control circuit;

wherein a ROM address signal generator is disposed between said switch and said ROM address counter so as to delay the output signal of the switch.

9. A DTMF signal generating circuit according to claim 8, wherein said first and second frequency dividing circuits include a dividing counter for counting pulse signals from said oscillatory circuit and first and second decoders for generating pulse signals when said dividing couter counts the pulses to the preset number, and wherein said ROM address signal generator is an RS flip-flop which is set by a signal of said switch and is reset when the count value of said dividing counter is less than the frequency dividing ratio.

* * * * *